US011719942B2

(12) United States Patent
Toride

(10) Patent No.: US 11,719,942 B2
(45) Date of Patent: Aug. 8, 2023

(54) OFFSETTING IMAGE LIGHT ABERRATION DUE TO WAVEGUIDE MOVEMENT IN DISPLAY ASSEMBLIES USING INFORMATION FROM PIEZOELECTRIC MOVEMENT SENSORS

(71) Applicant: Meta Platforms Technologies, LLC, Menlo Park, CA (US)

(72) Inventor: Yuri Toride, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/846,898

(22) Filed: Jun. 22, 2022

(65) Prior Publication Data

US 2022/0413296 A1    Dec. 29, 2022

Related U.S. Application Data

(60) Provisional application No. 63/214,982, filed on Jun. 25, 2021.

(51) Int. Cl.
*G02B 27/01* (2006.01)
*G09G 3/00* (2006.01)

(52) U.S. Cl.
CPC ......... *G02B 27/0172* (2013.01); *G09G 3/003* (2013.01); *G02B 2027/011* (2013.01); *G02B 2027/0178* (2013.01); *G09G 2320/02* (2013.01)

(58) Field of Classification Search
CPC .......... G02B 27/0172; G02B 2027/011; G02B 2027/0178; G09G 3/003; G09G 2320/02
See application file for complete search history.

(56) References Cited

U.S. PATENT DOCUMENTS 5,247,174 A * 9/1993 Berman ............... G02B 26/123
250/235
8,576,143 B1    11/2013 Kelly
10,977,815 B1 * 4/2021 Chao ...................... G06F 3/013
(Continued)

FOREIGN PATENT DOCUMENTS

WO        2021021470 A1    2/2021

OTHER PUBLICATIONS

Rendl C., et al., "FlexSense: A Transparent Self-Sensing Deformable Surface," In Proceedings of the 27th annual ACM Symposium on User interfaces Software and Technology (UIST '14), Oct. 2014, pp. 129-138.

(Continued)

*Primary Examiner* — Sanghyuk Park
(74) *Attorney, Agent, or Firm* — Fenwick & West LLP

(57) ABSTRACT

A display assembly monitors movements in a waveguide assembly and corrects for aberrations in image light caused by the monitored movements. For example, an artificial reality headset may include a display assembly that monitors for changes in shape or displacement of waveguide assemblies that generate three dimensional images for display with a real world environment. The display assembly includes movement sensors (e.g., piezoelectric movement sensors) coupled to the waveguide assembly. The movement sensors monitor the movement of the waveguide assembly and provide the monitored movement to a display controller that generates instructions for correcting aberrations in the image light.

20 Claims, 8 Drawing Sheets

(56) References Cited

U.S. PATENT DOCUMENTS

| | | |
|---|---|---|
| 2007/0199376 A1 | 8/2007 | Cavalloni et al. |
| 2016/0116741 A1* | 4/2016 | Sato ........................ G06F 3/013 345/8 |
| 2019/0066357 A1 | 2/2019 | Tokuchi |
| 2019/0227319 A1 | 7/2019 | Trail et al. |

OTHER PUBLICATIONS

International Search Report and Written Opinion for International Application No. PCT/US2022/035035, dated Oct. 25, 2022, 14 pages.

* cited by examiner

OFFSETTING IMAGE LIGHT ABERRATION DUE TO WAVEGUIDE MOVEMENT IN DISPLAY ASSEMBLIES USING INFORMATION FROM PIEZOELECTRIC MOVEMENT SENSORS

CROSS-REFERENCE TO RELATED APPLICATIONS

This application claims the benefit of U.S. Provisional Application No. 63/214,982, filed Jun. 25, 2021, which is incorporated by reference in its entirety.

FIELD OF THE INVENTION

This disclosure relates generally to display assemblies, and more specifically to offsetting image light aberration due to waveguide movement in display assemblies.

BACKGROUND

Display assemblies include one or more waveguides that provide image content. However, performance of display assemblies can be greatly degraded by even slight movements of the one or more waveguides. Examples of movements can include deformation or misalignment caused by stresses from mounting a display assembly to a larger device (e.g., an artificial reality headset), thermal stresses, electric shock, drop impact (e.g., dropping the headset), and more. Movement can result in image distortion, binocularity disparity, low image contrast, and other image display effects that reduce the accuracy with which images are projected through the display assemblies.

SUMMARY

A display assembly is described herein that monitors movements in a waveguide assembly and corrects for aberrations in image light caused by the monitored movements. For example, an artificial reality headset may include a display assembly that monitors for changes in shape or displacement of waveguide assemblies that generate three dimensional images for display with a real world environment. The display assembly includes movement sensors (e.g., piezoelectric movement sensors) coupled to the waveguide assembly. The movement sensors may be sub-micron precision sensors that are substantially transparent to both exhibit high sensitivity to small scale movements that affect projected image light and provide sufficient transmission efficiency to view the real world environment through the waveguide assembly. The movement sensors monitor the movement of the waveguide assembly and feed back the movement to a display controller that generates instructions for correcting aberrations in the image light. The instructions may include software modifications such as modifying the image light before projection to compensate for the deformed waveguide assembly, mechanical modifications such as instructing actuators of the display assembly to correct the shape of a deformed waveguide assembly, or a combination thereof. Thus, the display assembly described herein improves the quality of image light generated by conventional display assemblies by monitoring for movements in a waveguide assembly and correcting aberrations caused by the movements.

In one embodiment, a display assembly includes a waveguide assembly, one or more piezoelectric movement sensors coupled to the waveguide assembly, and a display controller. The waveguide assembly is configured to project image light towards an eyebox. Movement of the waveguide assembly may contribute at least in part to an amount of aberration in the projected image light. The one or more piezoelectric movement sensors are configured to monitor the movement of the waveguide assembly. The display controller is configured to correct for the amount of aberration in the image light based in part on the monitored movement.

In another embodiment, a method includes projecting image light from a waveguide assembly towards an eyebox. Movement of the waveguide assembly may contribute at least in part to an amount of aberration in the projected image light. The method further includes monitoring, via one or more piezoelectric movement sensors coupled to the waveguide assembly, the movement of the waveguide assembly. The amount of aberration in the projected image light is corrected based in part on the monitored movement.

In yet another embodiment, a non-transitory computer-readable storage medium includes stored instructions that, when executed by a processor of a device, cause the device to project image light from a waveguide assembly towards an eyebox, monitor the movement of the waveguide assembly via one or more piezoelectric movement sensors coupled to the waveguide assembly, and correct for an amount of aberration in the image light based in part on the monitored movement. The amount of aberration in the image light can be based in part on a movement of the waveguide assembly.

Figure 1A:
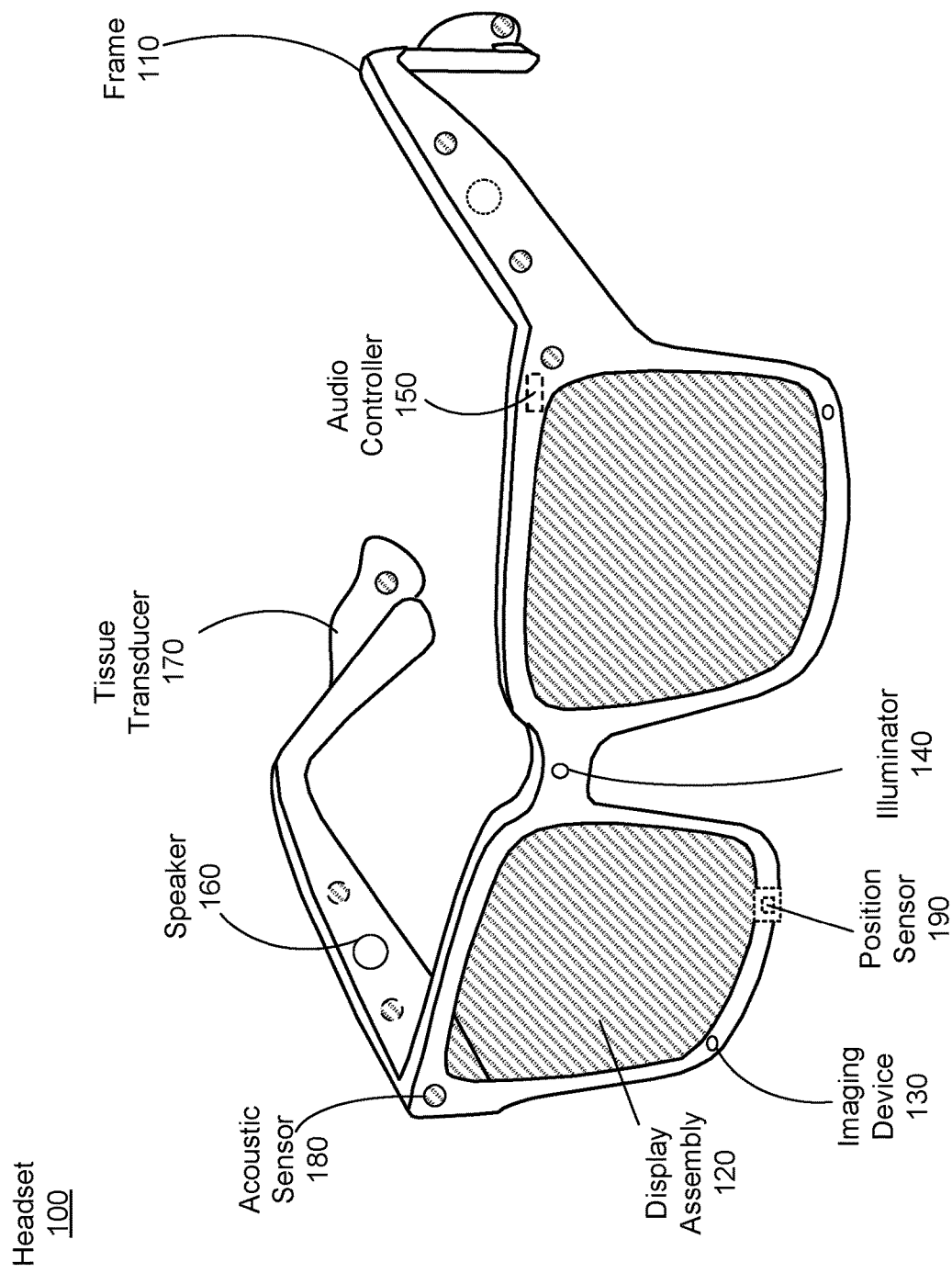
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments pertaining to a display assembly that offsets image light aberration due to waveguide movement are described herein. The display assembly may be part of, e.g., a headset. The display assembly monitors and dynamically corrects for movement of the one or more waveguides. The display assembly includes one or more waveguide assemblies and movement sensors that are coupled to one or more surfaces of the one or more waveguide assemblies. The movement sensors can be piezoelectric, piezoresistive, or a combination thereof. The movement sensors are substantially transparent and measure movement of the waveguide assembly. A display controller uses the measured movement to correct for aberration in the image light caused at least in part by the movement of the waveguide assembly. The correction may be done via software and/or mechanical movement (e.g., via actuators) of components of the display assembly (e.g., a projector assembly or a waveguide assembly). The movements may be detected in substantially real time (e.g., within one to two seconds) in response to an event that is likely to cause a movement. Thus, the monitored movement can be fed to a display controller to correct for a distortion or disparity in one or more waveguide assemblies.

Display assemblies may be subject to various stressors that deform, misalign, or otherwise cause movement in one or more waveguide assemblies in the display assembly. The movement in a waveguide causes distortion in the image displayed to the user due to aberrations in image light that is projected through the moved waveguide assembly. The display assembly described herein improves the quality of images being displayed by correcting for those aberrations. The display assembly also has an increased durability over a conventional display assembly that might otherwise be disposed of at the first sign of damage to its display capabilities.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly 105, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The display assembly 120 provides light to a user wearing the headset 100. The light may be light from environmental sources (e.g., lamps, sunlight, etc.) or light generated by the headset 100 (e.g., image light generated by a projector assembly of the headset 100). In some embodiments, the display assembly 120 generates image light that is provided to an eyebox of the headset 100. The eyebox is a location in space that an eye of user occupies while wearing the headset 100. The display assembly 120 may use a projector assembly and a waveguide assembly to provide light to the user. A projector assembly includes a light source (e.g., a two-dimensional source, one or more line sources, one or more point sources, etc.). A waveguide assembly includes one or more waveguides. Light from the light source is in-coupled into the one or more waveguides, which outputs the light in a manner such that there is pupil replication in an eyebox of the headset 100. In-coupling and/or outcoupling of light from the one or more waveguides may be done using one or more diffraction gratings. In some embodiments, the display assembly 120 includes a scanning element (e.g., waveguide, mirror, etc.) that scans light from the light source as it is in-coupled into the one or more waveguides. Note that in some embodiments, a portion of the display assembly 120 is opaque and does not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, the display assembly 120 is at least partially transparent, such that light from the local area may be combined with light from the one or more display elements to produce AR and/or MR content.

In some embodiments, the display assembly 120 does not generate image light, and instead is a lens that transmits light from the local area to the eyebox. For example, the display assembly 120 may be a lens without correction (non-prescription) or a prescription lens (e.g., single vision, bifocal and trifocal, or progressive) to help correct for defects in a user's eyesight. In some embodiments, the display assembly 120 may be polarized and/or tinted to protect the user's eyes from the sun.

In some embodiments, the display assembly 120 monitors movements in a waveguide assembly and corrects for aberrations in image light caused by the monitored movements. For example, the display assembly 120 can monitor for changes in shape or displacement of waveguide assemblies that generate three dimensional images for display with a real world environment. The display assembly 120 includes movement sensors (e.g., piezoelectric movement sensors) coupled to the waveguide assembly. The movement sensors monitor the movement of the waveguide assembly and provide the monitored movement to a display controller that generates instructions for correcting aberrations in the image light.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
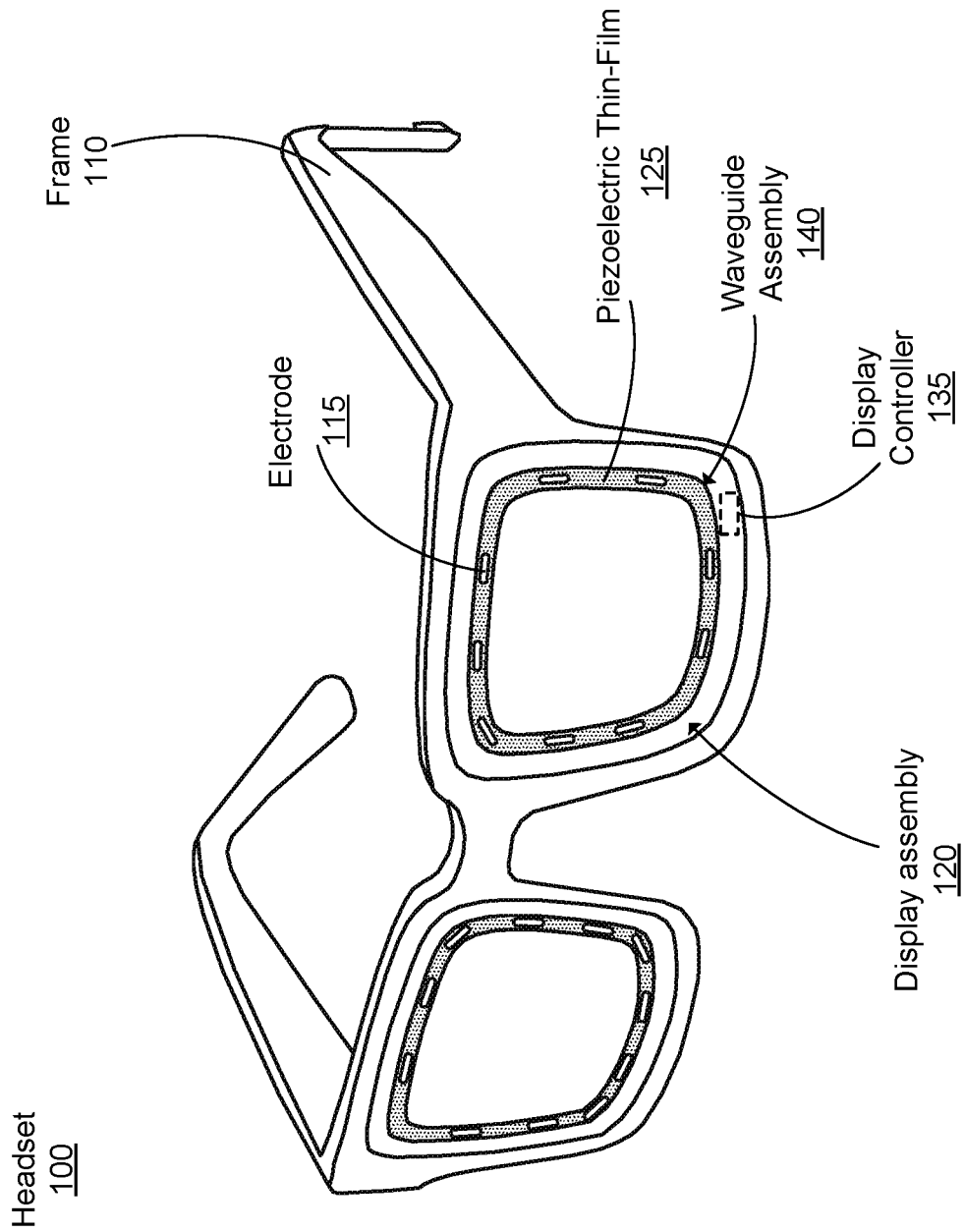
FIG. 1B is a perspective view of a headset of FIG. 1 showing sensors for detecting movement of a display assembly of the headset, in accordance with one or more embodiments.

FIG. 1B is a perspective view of a headset of FIG. 1 showing sensors for detecting movement of a display assembly of the headset, in accordance with one or more embodiments. The display assembly 120 may offset image light aberration caused by movement in a waveguide assembly 140 of the display assembly 120. In particular, the display assembly 120 can monitor and dynamically correct for movement of the waveguide assembly 140. The display assembly 120 includes the waveguide assembly 140, at least one movement sensor, and a display controller 135. The at least one movement sensor is coupled to one or more surfaces of the waveguide assembly 140. The piezoelectric movement sensors include one or more electrodes 115 and a piezoelectric thin film 125. The display controller 135 can use the measured movement to correct for aberration in the image light caused at least in part by the movement of the waveguide assembly 140. The correction may be done via software, mechanical movement (e.g., via actuators), or a combination thereof. A display assembly is further described in the description of FIG. 2.

Figure 2:
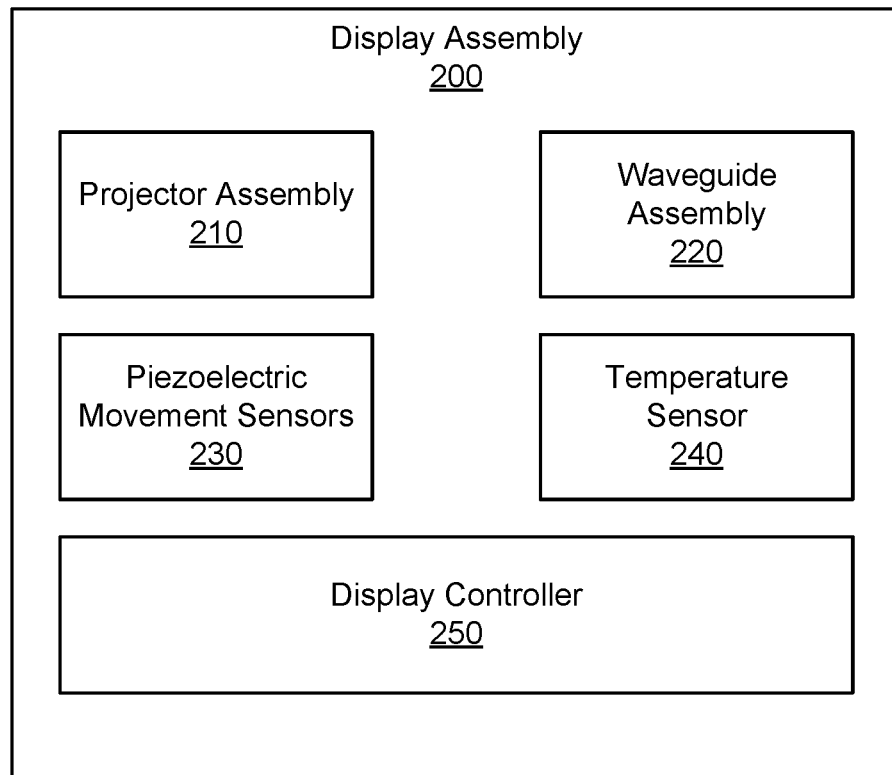
FIG. 2 is a block diagram of a display assembly, in accordance with one or more embodiments.

FIG. 2 is a block diagram of a display assembly 200, in accordance with one or more embodiments. The display assembly 120 of FIG. 1A and FIG. 1B may include all or some of the components of the display assembly 200. The display assembly 200 monitors and corrects for aberrations in a waveguide assembly 220 of the display assembly 200. In the embodiment of FIG. 2, the display assembly 200 includes a projector assembly 210, a waveguide assembly 220, piezoelectric movement sensors 230, and an display controller 250. Some embodiments of the display assembly 200 have additional, fewer, or different components than those described here. In a first example, the display assembly 200 may additionally include actuators for implementing mechanical correction of a deformed shape of the waveguide assembly 220 according to instructions generated by the display controller 250. In a second example, the display assembly 200 may exclude the temperature sensor 240. Similarly, in some cases, functions can be distributed among the components in a different manner than is described here.

The display assembly 200 generates image light, measures movement in a waveguide through which the generated image light travels, and corrects for the measured movement. The display assembly 200 includes a projector assembly 210 and the waveguide assembly 220 for generating and transporting light for reception by a user's eye(s), respectively. The display assembly 200 includes one or more piezoelectric movement sensors 230 to measure movement in a waveguide. A display controller 250 of the display assembly 200 corrects for an amount of aberration in the image light caused by the movement in the waveguide. The movement may be corrected via actuators and/or in software. A display assembly is further described in the description of FIG. 3.

The projector assembly 210 can project image light into the waveguide assembly 220. The projector assembly 210 generates the light that is incoupled into one or more waveguides of the waveguide assembly 220. The waveguides output the light, which combine to form an image in the eyebox. The projector assembly 210 may include light sources in different color channels (e.g., red, green, and blue) that generate image light. The different color channels may correspond to respective waveguides of the waveguide assembly 220. The projector assembly 210 can generate image light in accordance with instructions from the display controller 250. The projector assembly 210 generates at least a coherent or partially coherent image light. The projector assembly 210 may include a laser diode, a vertical cavity surface emitting laser, a light emitting diode, a tunable laser, or some other light source that emits coherent or partially coherent light. The projector assembly 210 emits light in a visible band (e.g., from about 390 nm to 700 nm), and it may emit light that is continuous or pulsed. In some embodiments, the projector assembly 210 may be a laser that emits light at a particular wavelength (e.g., 532 nanometers). The projector assembly 210 emits light in accordance with one or more illumination parameters received from the display controller 250. An illumination parameter is an instruction used by the projector assembly 210 to generate light. An illumination parameter may include, e.g., source wavelength, pulse rate, pulse amplitude, beam type (continuous or pulsed), other parameter(s) that affect the emitted light, or some combination thereof.

The waveguide assembly 220 outputs image light into an eye of a user. The image light may be generated by the projector assembly 210. In some embodiments, the generated image light may be incoupled (e.g., via one or more gratings) into the waveguide assembly 220. The waveguide assembly 220 may then output the incoupled image light into the eyebox. The waveguide assembly 220 includes one or more waveguides. The one or more waveguides are configured to receive image light from the projector assembly 210 and project the image light for a pupil replication in an eyebox. In some embodiments, the display assembly 200 includes a separate waveguide for each color channel. Alternatively, the waveguide assembly 220 may incouple image light from each color channel into a single waveguide. The waveguide assembly 220 may outcouple the incoupled light to the eyebox via one or more gratings. The gratings of the waveguide assembly 220 may include a diffraction grating, a holographic grating, a holographic reflector, or a combination thereof.

The waveguide assembly 220 may be composed of one or more materials that facilitate total internal reflection of the generated image light. For example, a grating of the waveguide assembly 220 that couples the generated image light into a waveguide may be a diffraction grating having a pitch in the range of 300 nanometers (nm) to 600 nm for total internal reflection. Similarly, a grating of the waveguide assembly 220 that decouples image light out of the waveguide can be a diffraction grating with a pitch configured to cause incident image light to exit the waveguide (e.g., the pitch having a range of 300 to 600 nm). A waveguide of the waveguide assembly 220 may be composed of e.g., silicon, plastic, glass, or polymers, or some combination thereof. The waveguide assembly 220 can have a relatively small form factor. For example, the waveguide assembly 220 may be approximately 50 mm wide along x-dimension, 30 mm long along y-dimension and 0.2-1 mm thick along z-dimension. The display assembly 200 may include multiple waveguide assemblies. For example, a first waveguide assembly may output image light into a left eye of a user while a second waveguide assembly may output image light into a right eye of the user.

The piezoelectric movement sensors 230 may measure and monitor movement or displacement of one or more waveguides of the waveguide assembly 220. The composition of a piezoelectric movement sensor may include a piezoelectric thin-film that is layered between a top electrode and a bottom electrode. In some embodiments, an electrode of the piezoelectric movement sensor has a length and/or width that ranges from one millimeter to five centimeters. The terms "top" and "bottom" are used for convenience and should not require orientation of the piezoelectric movement sensors 230. The electrodes may be composed of a metal nanowire ink, indium tin oxide (ITO), poly(3,4-ethylenedioxythiophene) polystyrene sulfonate (PEDOT:PSS), any suitable material for transparent electrodes, or a combination thereof. The piezoelectric thin-film may be composed of a polymer such as polyvinylidene fluoride-trifluoroethylene (PVDF-TrFE), any suitable flexible piezoelectric material, or a combination thereof. The piezoelectric thin-film may cover some or all of a surface of the waveguide assembly 220. In some embodiments, each piezoelectric movement sensor of the sensors 230 may have a separate set of electrodes. By contrast, additionally or alternatively, the piezoelectric movement sensors 230 may share one or more electrodes. For example, a bottom electrode may be shared between two or more of the sensors 230, where the two or more sensors have separate top electrodes with the shared bottom electrode. An example composition of a piezoelectric movement sensor is described in the description of FIG. 3. Further, the movement sensors are referred to throughout as piezoelectric movement sensors; however, the movement sensors for monitoring the movement of a waveguide assembly may include or may be replaced with piezoresistive movement sensors. The change in resistivity in response to a force caused by the movement of the waveguide assembly 220 may be used to monitor and correct for the movement. Additional examples of sensors include resistive sensors, inductive sensors, capacitive sensors, any suitable force or displacement sensor for monitoring waveguide movement (e.g., having sub-micron precision), or a combination thereof.

The piezoelectric movement sensors 230 may be co-located with the waveguide assembly 220 or at a location of the display assembly 200 proximal to the waveguide assembly 220. For example, the piezoelectric movement sensors 230 may be co-located at the periphery of a surface of the waveguide assembly 220. In another example, the piezoelectric movement sensors 230 may be located at a frame around the waveguide or at an area connecting waveguides (e.g., nose bridge of artificial reality glasses). The piezoelectric movement sensors 230 may be located at one or more surfaces of the waveguide assembly 220. Surfaces can include a surface proximal to an environment and a surface proximal to the user (i.e., with reference to when the display assembly is in use). The piezoelectric movement sensors 230 may be configured to have an orientation for measuring movement along that orientation. In one example, a piezoelectric movement sensor includes a top electrode that is shaped in a line or rectangle in a particular direction (e.g., horizontally in a line parallel to a line connecting the user's eyes). This piezoelectric movement sensor is configured to monitor for movement occurring in the same direction (e.g., a movement horizontally along the surface of the waveguide on which the piezoelectric movement sensor resides). The piezoelectric movement sensors 230 may have the same orientation (e.g., all oriented vertically). In some embodiments, the piezoelectric movement sensors 230 may be oriented orthogonal to one another (e.g., in vertical and horizontal directions). The piezoelectric movement sensors 230 may be oriented radially with respect to a center of the waveguide assembly 220 (e.g., radially from a portion of the waveguide that overlaps the user's pupil when the user wears a headset including the display assembly 200). Example locations and configurations of the piezoelectric movement sensors are described in the description of FIG. 4.

The piezoelectric movement sensors 240 may be substantially transparent. As referred to herein, a value described using "approximately" or "substantially" may be construed as having a range within +/−10% of the value unless another meaning is apparent from the context. For example, "approximately ten" should be understood to mean "in a range from nine to eleven." In another example, substantially transparent can refer to a transmission of light through the piezoelectric movement sensors that is within 90-100% light transmission. In some embodiments, the piezoelectric movement sensors 240 within a potential field of view of a user are substantially transparent to visible light. For example, a subset of the piezoelectric movement sensors 240 adjacent to a border of an eyebox of the display assembly 200 are within a potential field of view and are substantially transparent. In some embodiments, at least one of the piezoelectric movement sensors 240 is outside of a field of view of the user and is opaque or substantially opaque to visible light. Substantially opaque may refer to a transmission of light through the piezoelectric movement sensors that is within 10% of 0% light transmission. For example, as depicted in FIG. 1B, a portion of the display assembly 120 along the outer border of display elements (e.g., lenses) may be substantially opaque.

The temperature sensor 240 measures a temperature associated with the movement of the waveguide assembly 220. A temperature that the waveguide assembly is operating under may negatively affect the waveguide assembly 220 (e.g., heat expands or bends the shape of a waveguide). Examples of temperatures associated with the waveguide assembly include a temperature of a component of the display assembly 200, a temperature of an environment in which the display assembly 200 operates, any suitable temperature measurement associated with the operation of the display assembly 200, or combination thereof. Examples of temperature sensors include thermocouples, thermistors, resistance temperature detector (RTD), infrared sensors, any suitable sensor for measuring temperature, or a combination thereof. A temperature sensor 240 may have a form factor, location, or combination thereof suitable for measuring a component of the display assembly 200. The display assembly 200 may include multiple temperature sensors in addition to the temperature sensor 240. For example, a first temperature sensor may be located proximal to the projector assembly 210 and a second temperature sensor may be located proximal to one of the piezoelectric movement sensors 230. Similarly, the display assembly 200 may include both one or more co-located temperature sensors and one or more remotely located temperature sensors. In some embodiments, temperature sensed by the temperature sensor 240 may be used to determine an accuracy with which the piezoelectric movement sensor 240 monitors for movements in the waveguide assembly 220. For example, the sensitivity of a material that may be included in the piezoelectric movement sensor 240 (e.g., a PVDF polymer) can experience a degradation in sensitivity commensurate with an increase in temperature. The temperature sensor 240 may provide a measured temperature to the display controller 250 to determine that the temperature has exceeded a threshold temperature for accuracy of the piezoelectric movement sensors 230 and in response, determine not to correct an amount of movement because the amount determined may be inaccurate.

In a first example of a configuration of the temperature sensor 240, the temperature sensor 240 is a surface thermocouple may be coupled to the waveguide assembly 220 to measure the temperature at a portion of a waveguide of the display assembly 200. In a second example of a configuration of the temperature sensor 240, the temperature sensor 240 is a thermistor is embedded within a nose bridge connecting two waveguide assemblies of the display assembly 200. The temperature measured at this location connecting two waveguide assemblies may be associated with a relative movement between the two waveguide assemblies. Although depicted as co-located with the display assembly 200, the temperature sensor 240 may alternatively be located remote from the display assembly 200. The remotely located temperature sensor may be communicatively coupled to the display assembly 200 via communications circuitry at the display assembly 200 or a device to which the display assembly 200 is coupled. For example, temperature measured by a national weather service is provided to a user's mobile phone (e.g., at a weather application), communicated to a headset of the user via Bluetooth circuitry at the headset, and accessed by the display assembly 200 (e.g., by the display controller) to determine a correction for aberration in image light based on movement monitored by the movement sensors and the accessed temperature. The use of a temperature sensor to correct for an amount of aberration is further described in the description of FIG. 5.

The display controller 250 can generate instructions to cause one or more actuators to mechanically deform or move the waveguides of the waveguide assembly 220. Examples of actuators include microelectromechanical systems (MEMS) actuators (e.g., electrostatic, electrothermal, electromagnetic, and piezoelectric actuation). The actuators may be located proximal to the piezoelectric movement sensors 230. Alternatively or additionally, the actuators may be located around the waveguide assembly 220 (e.g., in the frame of a headset in which the display assembly 200 is included). The actuators may be substantially transparent to increase light transmission efficiency.

The display controller 250 controls the display operations of the display assembly 200. The controller 250 determines display instructions for the waveguide assembly 220. Display instructions are instructions to render one or more images. In some embodiments, display instructions may simply be an image file (e.g., bitmap). The display instructions may be received from, e.g., a console of a VR system. The controller 250 includes a combination of hardware, software, and/or firmware not shown here so as not to obscure other aspects of the disclosure. The display controller 250 can determine instructions for correcting an amount of aberration in projected image light caused by movement in a waveguide assembly. These instructions are referred to as "movement instructions." The display controller 250 may determine movement instructions using at least a monitored movement of the waveguide assembly. For example, the display controller 250 may determine a mapping of a movement instruction to a monitored movement or an estimated amount of aberration in the image light caused in part by the monitored movement.

The display controller 250 may determine an estimated amount of aberration based on at least the movement monitored by the piezoelectric movement sensors 230. The display controller 250 may receive sensor measurements from sensors in addition to the piezoelectric movement sensors 220. Such supplemental sensors may include temperature sensors (e.g., the temperature sensor 240), motion sensors, location sensors, proximity sensors, any suitable sensor measuring data affecting the performance of the waveguide assembly or the measurement of the movement of the waveguide assembly, or a combination thereof waveguide assembly 220 movement In an example of using a supplemental sensor, the temperature sensor 240 is a supplemental sensor. The display controller 250 may receive a temperature measurement from the temperature sensor 240 and access a set of models representative of various waveguide movements measured under the received temperature measurement. Various sets of models for movements measured under respective temperatures may be stored at a storage of the display assembly 200 or a device in which the display assembly 200 is included (e.g., a headset) or stored at a remote server communicatively coupled to the display assembly.

In some embodiments, the display controller 250 may use a supplemental sensor to determine when to check for a movement in the waveguide assembly 220. In some embodiments, the display controller 250 may periodically check for movements while the display assembly 200 is in active use (e.g., while the user is using an artificial reality application). Additionally or alternatively, the display controller 250 may check for movement in response to receiving a measurement from a supplemental sensor indicating that a movement has likely occurred. The display controller 250 may receive the measurement, and in response, determine a likelihood that the movement has occurred based on the received measurement. For example, in response to receiving a measurement from a motion sensor that the display assembly 200 has been subject to a rapid acceleration and sudden stop (e.g., corresponding to a drop of the headset), the display controller 250 may use a model (e.g., statistical model or machine learning model) to determine a likelihood that an event that can cause a movement in the waveguide has occurred. In response to determining that the likelihood meets or exceeds a threshold likelihood, the display controller 250 may proceed to use the piezoelectric movement sensors 240 to measure movement in the waveguide assembly 220. In response to determining that the likelihood does not exceed the threshold likelihood, the display controller 250 may determine not to check for a movement at that time. By reducing the number of instances during which movement in the waveguide assembly is monitored (e.g., using a predetermined frequency or upon the occurrence of a condition such as detecting a drop), the display assembly 200 may reduce the power resources consumed relative to continuously monitoring for movement in the waveguide assembly. Reducing the power consumed may be especially beneficial for mobile or wireless devices integrating the display assembly 200 (e.g., all-day wearable AR glasses) that rely on a battery.

The display controller 250 may determine an estimated accuracy level of the monitored movement based on supplemental sensors. In some embodiments, the display controller 250 may use the temperature measured by the temperature sensor 240 to determine the estimated accuracy level. The display controller 250 may receive a temperature measurement and compare the temperature measurement to a threshold temperature or temperature range. The threshold temperature may represent a minimum temperature (e.g., 150 degrees Celsius or approximately 300 degrees Fahrenheit) at which the measurements by the piezoelectric movement sensors cannot be used. The temperature range may represent a range of temperatures at which the measurements can be used (e.g., between −20 and 149 degrees Celsius). In response to the comparison, the display controller 250 may determine to proceed to with determining a correction to an amount of aberration in projected image light or not to proceed with determining the correction due to a likely inaccurate movement measurement caused by temperature distortion.

In some embodiments, the display controller 250 may use eye tracking information to monitor for movement in the waveguide assembly. For example, the eye tracking information, representative of the user's gaze at a projected image distorted due to an aberration in the waveguide assembly, may be used in combination with information from the piezoelectric movement sensors 240 to determine, by the display controller 250, a likelihood that a movement has occurred at a particular location of the waveguide assembly.

The display controller 250 may correct for aberrations in image light affected by movements of the waveguide assembly 220 using one or more of a software correction or mechanical correction. The correction may be represented through one or more instructions executable by components of the display assembly 200. In some embodiments, the display controller 250 inputs the detected movement of the waveguide assembly 220 monitored by the piezoelectric movement sensors 230 into a model (e.g., a statistical model or a machine-learned model). The model can estimate an amount of aberration (e.g., blurring, distortion, chromatic aberration, etc.) caused by the movement of the waveguide assembly 220. The display controller 250 uses the estimated amount of aberration to determine a movement instruction for correcting the detected movement. Software movement instructions may include modifications to the image light generated by the projector assembly 210. These modifications can mitigate the estimated amount of aberration. Mechanical movement instructions may include modifications to a shape of the waveguide assembly 220. Mechanical movement instructions may cause actuators to move one or more waveguides of the waveguide assembly 220 back into a shape or position that allows for the display of an accurate image to the user. The display controller 250 may input the detected movement of the waveguide assembly 220 into a model, which may be the same or a different model as referenced previously with respect to determining an estimated amount of aberration, and receive as output from the model, an estimated amount of misalignment of the waveguide assembly 220. The display controller 250 may then use the estimated amount of misalignment to determine mechanical movement instructions for actuators to move the waveguide assembly 220 into a position that allows for the user to view correctly projected images. Although not depicted in FIG. 2, the display assembly 200 may include actuators that modify the shape of a waveguide of the waveguide assembly 220 according to the movement instructions.

In some embodiments, the display controller 250 may compare a displacement or movement as measured by the piezoelectric movement sensors 230 to a predetermined movement model. One example of a predetermined model may include features from a Zernike model of aberrations to estimate an amount of aberration. The display controller 250 may access a Zernike model of aberrations associated with distortion in the sagittal direction (i.e., the "vertical tilt" or "Y-tilt" model), determine a similarity between the measured movement and a Zernike model of an aberration, and in response to determining that a threshold similarity has been met, apply predetermined movement instructions associated with the vertical tilt distortion. The movement instructions may be one or more of modifying the image light generated by the projector assembly 210 or modifying the shape of the waveguide assembly 220 to correct for the aberration in the vertical direction.

The display controller 250 may determine a movement instruction that corrects for binocular disparity (e.g., misalignment) between two waveguides (e.g., waveguides for the left and right eyes). The display controller 250 may receive measurements from one or more piezoelectric movement sensors monitoring a relative movement between a first waveguide assembly and a second waveguide assembly of the display assembly 200. The display controller 250 can determine movement instructions modifying at least one of a first image light projected by the first waveguide assembly or a second image light projected by the second waveguide assembly based on the relative movement. The projector assembly 210 may then execute the movement instructions to generate the at least one of the modified first or second image lights. The at least one of the modified first image light or the modified second image light can correct for aberration affecting the display of a three dimensional artificial reality object that the first and second image lights were generated to display.

Figure 3:
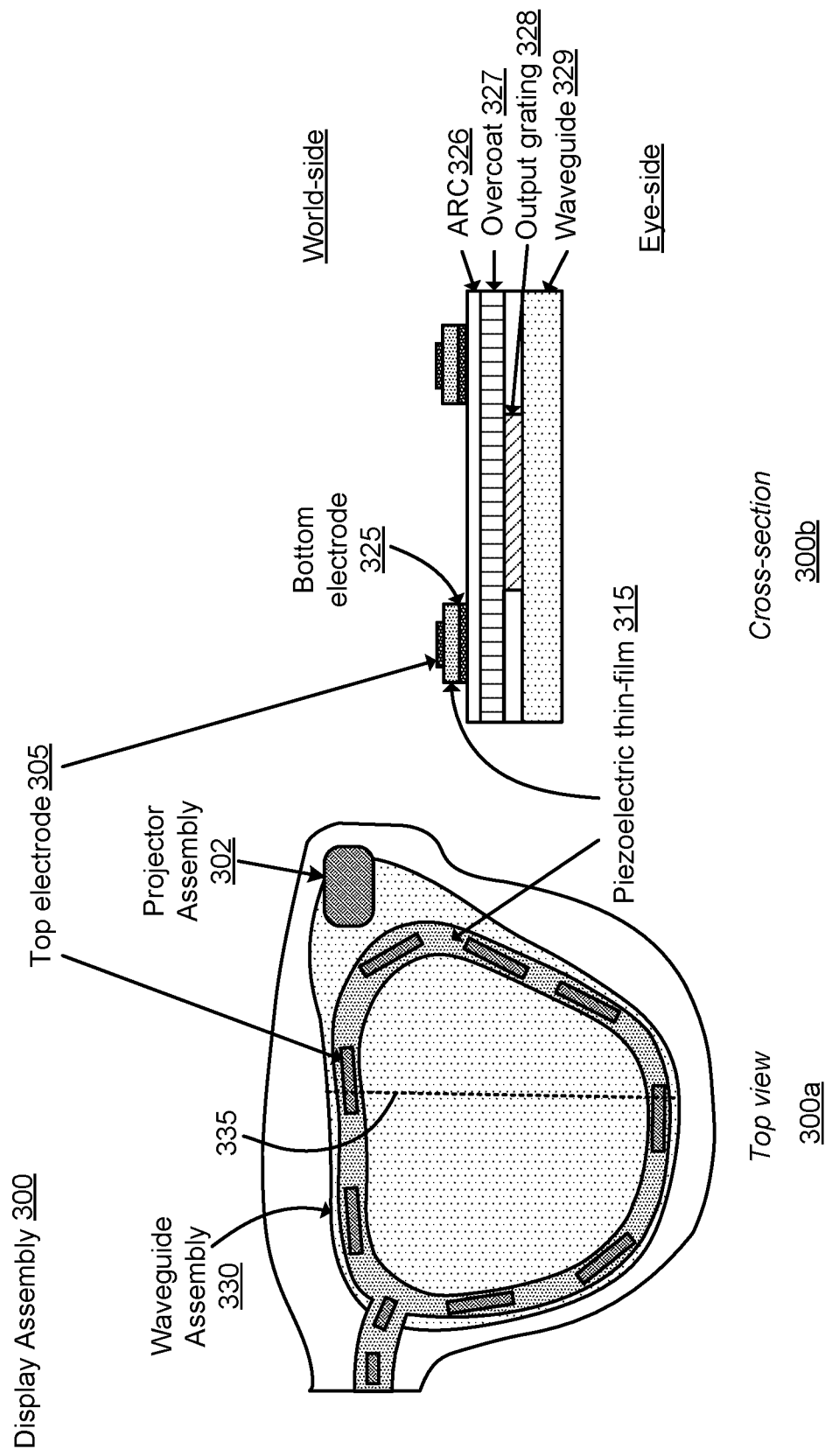
FIG. 3 is a top view and cross sectional view of a display assembly, in accordance with one or more embodiments.

FIG. 3 is a top view 300a and cross-sectional view 300b of a display assembly 300, in accordance with one or more embodiments. The cross-sectional view 300b is taken from a line 335 shown in the top view 300a. The top view 300a of the display assembly 300 shows piezoelectric movement sensors layered over a waveguide assembly 330 for a left eye. The waveguide assembly 330 is coupled to a projector assembly 302.

The projector assembly 302 projects image light into the waveguide assembly 330 for displaying an image to the user. Light from the projector assembly 302 may be incoupled into the waveguide assembly 330 (via one or more gratings) and outcoupled (via a different set of one or more gratings) toward an eyebox. The projector assembly 302 may be an embodiment of the projector assembly 210. The projector assembly 302 may include light sources in three different color channels (e.g., red, green, and blue) that generate image light.

The waveguide assembly 330 outputs image light into an eye of the user. Image light generated by the projector assembly 302 may be received by the waveguide assembly through one or more gratings and output towards an eyebox through a different set of gratings. The waveguide assembly 330 may include multiple waveguides. For example, the waveguide assembly 330 may include a separate waveguide for each color channel.

Piezoelectric movement sensors of the display assembly 300 monitor for movement of the waveguide assembly 330 and provide monitored movement to a display controller for correcting an amount of aberration in image light caused by the movement. The piezoelectric movement sensors may each include a top electrode 305, a piezoelectric thin-film 315, and a bottom electrode 325. The display assembly 300 shows a center region of the waveguide assembly that is circumscribed by a peripheral region. In the illustrated embodiment, a piezoelectric thin-film 315 of the piezoelectric movement sensors is located in the peripheral region and not the center region. While the piezoelectric thin-film 315 is depicted as a continuous layer in the peripheral region, in alternative embodiments, the piezoelectric thin-film 315 may be separated into discrete areas layered over a bottom electrode and the waveguide assembly 330. For example, substantially under each of the top electrodes only. This configuration may involve an increase in fabrication complexity, but may reduce the impact of the piezoelectric movement sensors on an image quality. A layer of the piezoelectric thin-film 315 may decrease light transmission efficiency through the area where the layer exists. The separation of the thin-film 315 into discrete areas enables an improvement in light transmission efficiency relative to a layer of thin-film over an entirety of the waveguide assembly 330.

The piezoelectric movement sensors are further depicted as extending over the nose bridge of the headset in which the display assembly 300 is included. The piezoelectric movement sensors extending over the nose bridge and in contact with both the waveguide assemblies for the left and right eyes may measure a relative movement between the two waveguide assemblies (e.g., a misalignment). The top-view 300a shows top electrodes of the piezoelectric movement sensors in a circular oriented in the peripheral region. The number, spacing, size, and orientation of the top electrodes may be different than what is depicted in top view 300a. For example, there may be a horizontally oriented top electrode that spans the top border of the peripheral region (i.e., proximal to the top of the user's head when the headset is worn) in place of the two top electrodes depicted at the top border in top view 300a.

The cross-section 300b of the display assembly 300 shows piezoelectric movement sensors coupled to a waveguide 329 of the display assembly 300 via one or more intermediate layers. The piezoelectric movement sensors are located at the side of the display assembly 300 closer to the environment (i.e., distal from an eye of a user). The side closer to the environment may be referred to as the "world-side" or as "an outward facing area." The side closer to the user may be referred to as the "eye-side" or as "an inward facing area." Each piezoelectric movement sensor may include a bottom electrode 325, piezoelectric thin film 315, and a top electrode 305. In some embodiments, the piezoelectric movement sensors may be at one or more of the world-side or eye-side. The top electrode 305 and the bottom electrode 325 may be composed of one or more of a metal nanowire ink, indium tin oxide (ITO), or poly(3,4-ethylenedioxythiophene) polystyrene sulfonate (PEDOT:PSS). Optionally, a polyethylene terephthalate (PET) substrate may be included adjacent to the bottom electrode 325 (e.g., below the bottom electrode 325, proximate to the user's eye). The waveguide assembly 330 includes the waveguide 329. A waveguide may be composed of a silicon carbide (SiC) substrate. While a single waveguide grating is shown, in other embodiments there may be waveguide and grating for each color channel (e.g., vertically stacked).

The intermediate layers may include an output grating 328, an overcoat 327, and an anti-reflective coating (ARC) 326. This configuration of layers may be present at the center region of the waveguide assembly 330. In some embodiments, the intermediate layers may be different, fewer, or greater. For example, at the peripheral regions of the waveguide assembly 330, the intermediate layers may include only the overcoat 327 and the ARC 326, but not the output grating 328. As shown in the cross-section 300b, the output grating 328 is not layered beneath the piezoelectric movement sensors that are located at the peripheral regions of the waveguide assembly 330. In some embodiments, the piezoelectric movement sensors may couple directly to a surface of the waveguide absent the intermediate layers. One or more of the top electrode 305, the piezoelectric thin film 315, or the bottom electrode 325 may be substantially transparent to light in the visible band.

Figure 4:
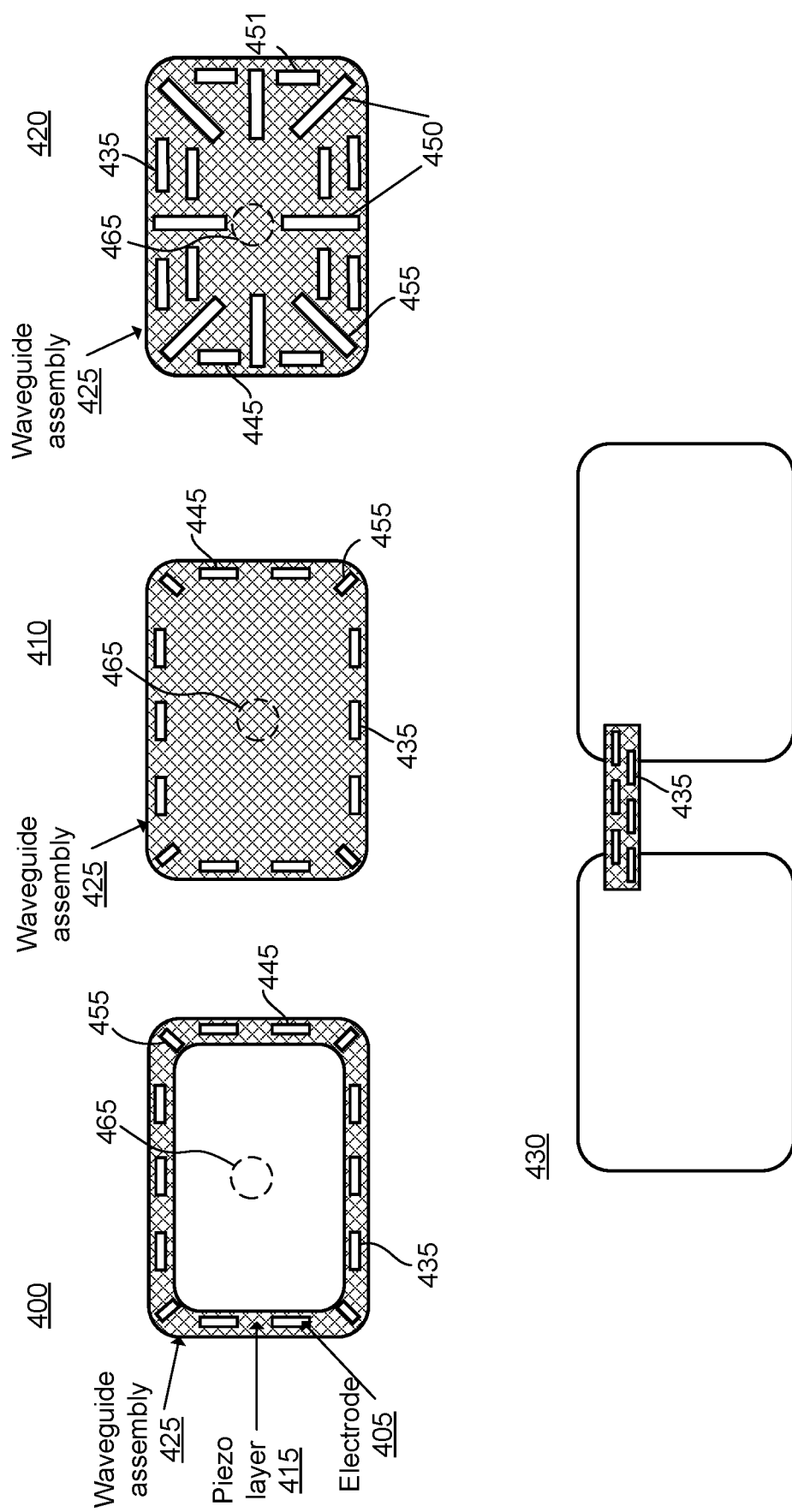
FIG. 4 depicts movement sensor configurations, in accordance with various embodiments.

FIG. 4 depicts movement sensor configurations, in accordance with various embodiments. In a configuration 400, piezoelectric movement sensors are located only over a peripheral region of a waveguide assembly 425. The piezoelectric thin-film layer 415 is layered over the entirety of the peripheral region while top electrodes 405 are in separated locations throughout the peripheral region. The top electrodes 405 are shown in vertical, horizontal, and diagonal orientations. In particular, the vertically oriented electrodes 445, horizontally oriented electrodes 435, and diagonally oriented electrodes 455 are shown in the configurations in FIG. 4. The vertically oriented top electrodes 445 may monitor vertical movements. The horizontally oriented top electrodes 435 may monitor horizontal movements. The diagonally oriented top electrodes 455 may monitor both horizontal and vertical movements. The size of the top electrodes 405 are depicted as substantially consistent across each top electrode. In alternative embodiments, the size of the top electrodes 405 may be different from one another.

The dimensions of the electrodes may be sized such that movement of a waveguide assembly can be measured while also differentiating the shape of deformations. An electrode having a dimension that is sized too large (e.g., an electrode that is greater than 5 centimeters in length and/or width while not extending beyond the dimensions of the waveguide assembly on which it is overlaid) may be unable to provide a measurement of deformation that distinguishes the deformation's shape. An electrode having a dimension that is sized too small (e.g., a non-zero length that is less than one millimeter) may be unable to detect that a deformation has occurred. Although the electrodes in FIG. 4 are depicted as being rectangular in shape, the electrodes may have different shapes (e.g., circular, elliptical, triangular, or any suitable polygonal shape).

In a configuration 410, piezoelectric movement sensors are similarly located and oriented to the configuration 400. However, the piezoelectric thin-film layer 415 is located over all of the waveguide assembly 425 rather than only over the peripheral region. The configuration 410 may have a benefit over the configuration 400 with relation to the ease of manufacturing. For example, manufacturing a layer of piezoelectric thin-film over the entirety of the waveguide assembly 425 may be less complicated than manufacturing a layer that is only at the peripheral region.

In a configuration 420, the piezoelectric thin-film layer 415 is also located over all of the waveguide assembly 425. The configuration of the piezoelectric movement sensors has changed from the sensor configurations in the configurations 400 and 410. The configuration 420 includes a greater number of piezoelectric movement sensors than in the configurations 400 and 410. Additionally, a length of the top electrodes is not consistent across each electrode. For example, electrodes 450 are longer than the electrode 451. Certain top electrodes (e.g., electrodes 450) are evenly distributed radially around a center 465 of the waveguide assembly 425 and may have larger dimensions than other top electrodes (e.g., the top electrodes 405) shown in the configurations 400 and 410. An electrode whose dimensions cover more surface area can capture more information regarding movement of the waveguide assembly. This benefit may be considered alongside a possibility that too large of an electrode may be unable to measure a distinguishable shape in a waveguide assembly's deformation. A subset of the top electrodes 405 proximal to the horizontal edges of the waveguide assembly 425 are oriented horizontally and a subset of the top electrodes 405 proximal to the vertical edges of the waveguide assembly 425 are oriented vertically. Similar to the configurations 400 and 410, the configuration 420 includes the top electrodes 405 located around the center of the waveguide assembly 425 such that the center does not include top electrodes 405. The omission of top electrodes 405 from the center of the waveguide assembly 425 may improve the light transmission efficiency through the center of the waveguide assembly 425.

In a configuration 430, the piezoelectric movement sensors are located exclusively on the nose bridge connecting two waveguide assemblies for the left and right eyes. While the piezoelectric movement sensors in the configuration 430 are shown in a horizontal orientation, the orientation may additionally or alternatively be vertical, diagonal, or a combination of horizontal, vertical, and diagonal orientations.

Although FIG. 4 shows the configurations 400, 410, 420, and 430 separately, one or more of the configurations may be combined. For example, the configuration 400 may be combined with the configuration 430 such that the piezoelectric movement sensors are located at the edges of the waveguides for both eyes in addition to the nose bridge connecting the two waveguides.

Figure 5:
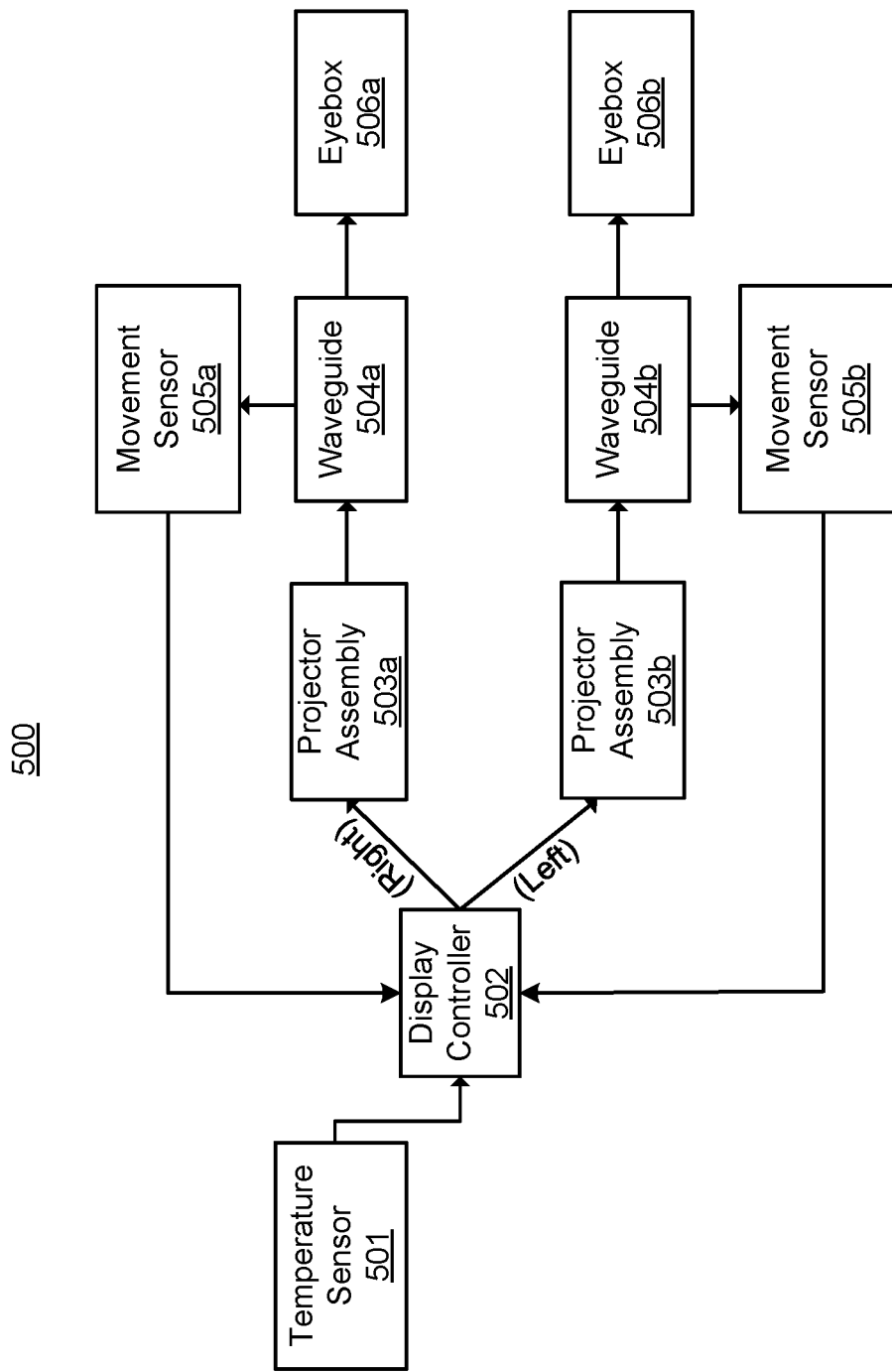
FIG. 5 is a block diagram of a feedback process for correcting aberrations monitored by movement sensors, in accordance with one or more embodiments.

FIG. 5 is a block diagram 500 of a feedback process for correcting aberrations monitored by piezoelectric movement sensors, in accordance with one or more embodiments. A display controller 502 is coupled to a temperature sensor 501, movement sensors 505a and 505b, and projector assemblies 503a and 503b. The projector assembly 503a is used to generate image light for display to a right eye of a user and is coupled to a waveguide 504a that outputs the image light to an eyebox 506a. The projector assembly 503b is used to generate image light for display to a left eye of the user and is coupled to a waveguide 504b that outputs the image light to an eyebox 506b. The movement sensor 505a monitors for movements in the waveguide 504a and the movement sensor 505b monitors for movements in the waveguide 504b.

The display controller 502 provides instructions to the projector assemblies 503a and 503b, which generate image light that is projected through the waveguides 504a and 504b, respectively. The movement sensors 505a and 505b feed back monitored movements in the waveguides 504a and 504b, respectively, to the display controller 502. The display controller 502 corrects for an amount of aberration in one or more of the waveguide 504a or 504b based on at least the fed back movement measurements. The display controller 502 may use one or more models to estimate an amount of aberration in image light or an amount of misalignment of the waveguides 504a or 504b using the fed back movement measurements. Based on the estimates output from the model(s), the display controller 502 determines instructions for software and/or mechanical correction to the waveguides 504a or 504b. As illustrated, the display controller 502 can provide instructions to the projector assemblies 503a and 503b to generate modified image light such that aberration caused by the movement is offset. Furthermore, although not depicted, in some embodiments, there may also be actuators that physically deform and/or position one or more of the projector assemblies 503a and 503b and/or one or more of the waveguides 504a and 504b to offset the aberration.

In some embodiments, the display controller 502 uses additional sensor information to correct for the amount of aberration. For example, the temperature of the display assembly in which the waveguides 504a and 504b reside or the environment surrounding the display assembly is measured by a temperature sensor 501 and provided to the display controller 502. The display controller 502 can use the measured temperature to determine an accuracy level of the measured movement, as the accuracy of movement sensors, such as piezoelectric sensors, decreases as temperature increases. Additional or alternative sensors supplementing the movement sensors 505a and 505b can include motion sensors, location sensors (e.g., Global Positioning System sensors), any suitable sensor measuring data impacting the performance of the movement sensors or the movement of the waveguides, or a combination thereof.

While the feedback process of FIG. 5 shows the components of a display assembly used to improve the display of images at a user's eye, the feedback process may similarly be used to provide corrected image light to a scanning system. In an example of the display assembly in a scanning system, the display assembly may include a light source generating beams of light (e.g., lasers) to scan an object (e.g., a three dimensional object). The projector assemblies 503a and 504b may include, for example, lasers. The beams of light may travel through the waveguides 504a and 504b, and the movement sensors 505a and 505b may provide a measurement of movement in the waveguides 504a and 504b to the display controller 502 determine an amount of aberration in the beams of light that negatively impacts the scanning of the object. In one example of an effect of waveguide movement in a scanning system, movement in the waveguides can change the expected time of flight through the light beams through waveguides (towards the scanned object, reflected from the scanned object, or both), where the expected time of flight through the waveguides is used to determine a depth of the 3D object's surface. The display controller 502 may use the measured movement to determine movement instructions for the amount of aberration in the beams of light produced by the lasers or reflected from the scanned object. Thus, in this scanning system example, the eyeboxes 506a and 506b may be replaced with the object to be scanned or replaced with one or more camera sensors for receiving beams of light reflected from the scanned object.

Figure 6:
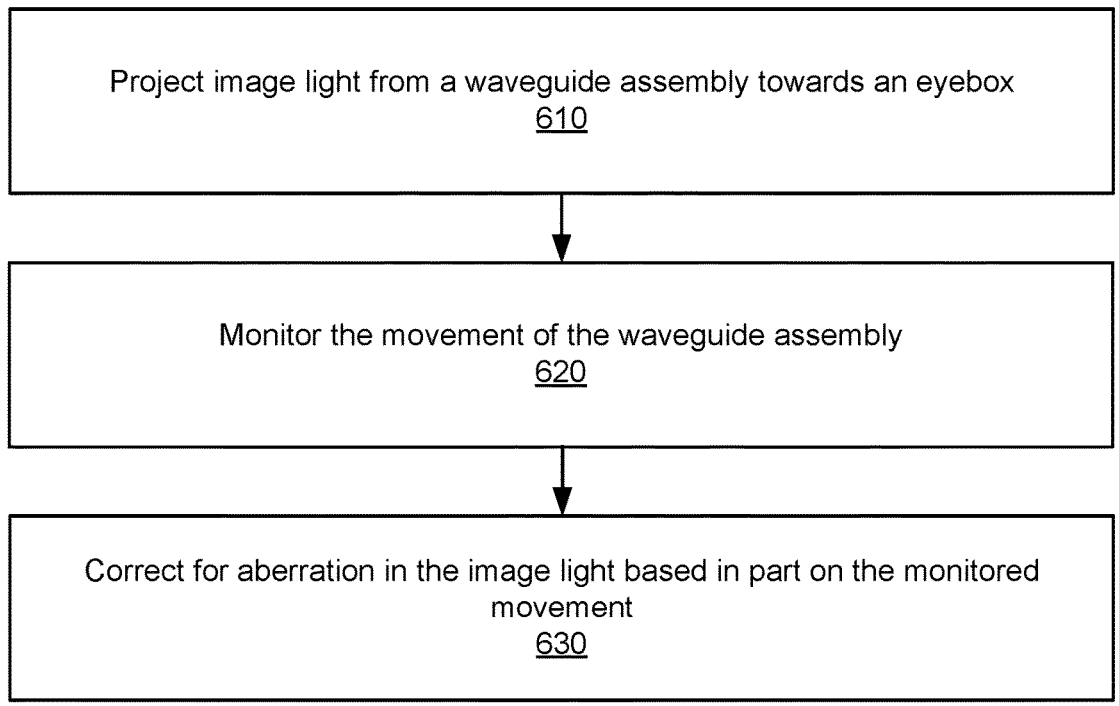
FIG. 6 is a flowchart illustrating a process for correcting an amount of aberration of a waveguide assembly, in accordance with one or more embodiments.

FIG. 6 is a flowchart illustrating a process for correcting an amount of aberration of a waveguide assembly, in accordance with one or more embodiments. The process shown in FIG. 6 may be performed by components of a display assembly (e.g., the display assembly 200). Other entities may perform some or all of the steps in FIG. 6 in other embodiments. Embodiments may include different and/or additional steps, or perform the steps in different orders. For example, the display assembly may measure movement in a waveguide assembly prior to the projection of image light through the waveguide assembly.

The display assembly projects 610 image light from a waveguide assembly towards an eyebox. The display controller may instruct the projector assembly to generate image light. For example, while the user of a headset having the display assembly is interacting with an artificial reality application, the display controller instructs the projector assembly to render a three dimensional image of an object at the eyebox for display to the user.

The display assembly monitors 620 the movement of the waveguide assembly. Piezoelectric movement sensors may measure a change in the shape of the waveguide assembly (e.g., caused by an electric shock, thermal stress, or a drop of the display assembly). Additionally or alternatively, the display assembly may monitor for displacement of the waveguide assembly (e.g., movement due to a loose or otherwise deteriorating frame of the headset configured to hold the waveguide assembly in place). The piezoelectric movement sensors may be configured around a peripheral region of a waveguide (e.g., the configuration 400 of FIG. 4). Additional piezoelectric movement sensors may be located at a nose bridge of the headset to monitor for relative movement between two waveguide assemblies of the headset (e.g., respective waveguide assemblies for outputting image light to the left and right eyes to create a three dimensional image).

The display assembly corrects 630 for aberration in the image light based in part on the monitored movement. A display controller of the display assembly may receive the measured movement monitored by the piezoelectric movement sensors. The display controller may determine movement instructions to correct for an amount of aberration in the image light projected 610 using at least the monitored movement. The display controller may use one or more models to estimate an amount of aberration in image light or an amount of misalignment of the waveguide assembly using the movement measured by the piezoelectric movement sensors. Based on the estimates output from the model(s), the display controller can determine instructions for software and/or mechanical correction (e.g., via actuators) to the waveguide assembly. In some embodiments, the display controller may additionally use a temperature at one or more waveguide assemblies, as measured by a temperature sensor, to determine an estimated accuracy of the monitored movement, an estimated amount of aberration, or combination thereof.

Figure 7:
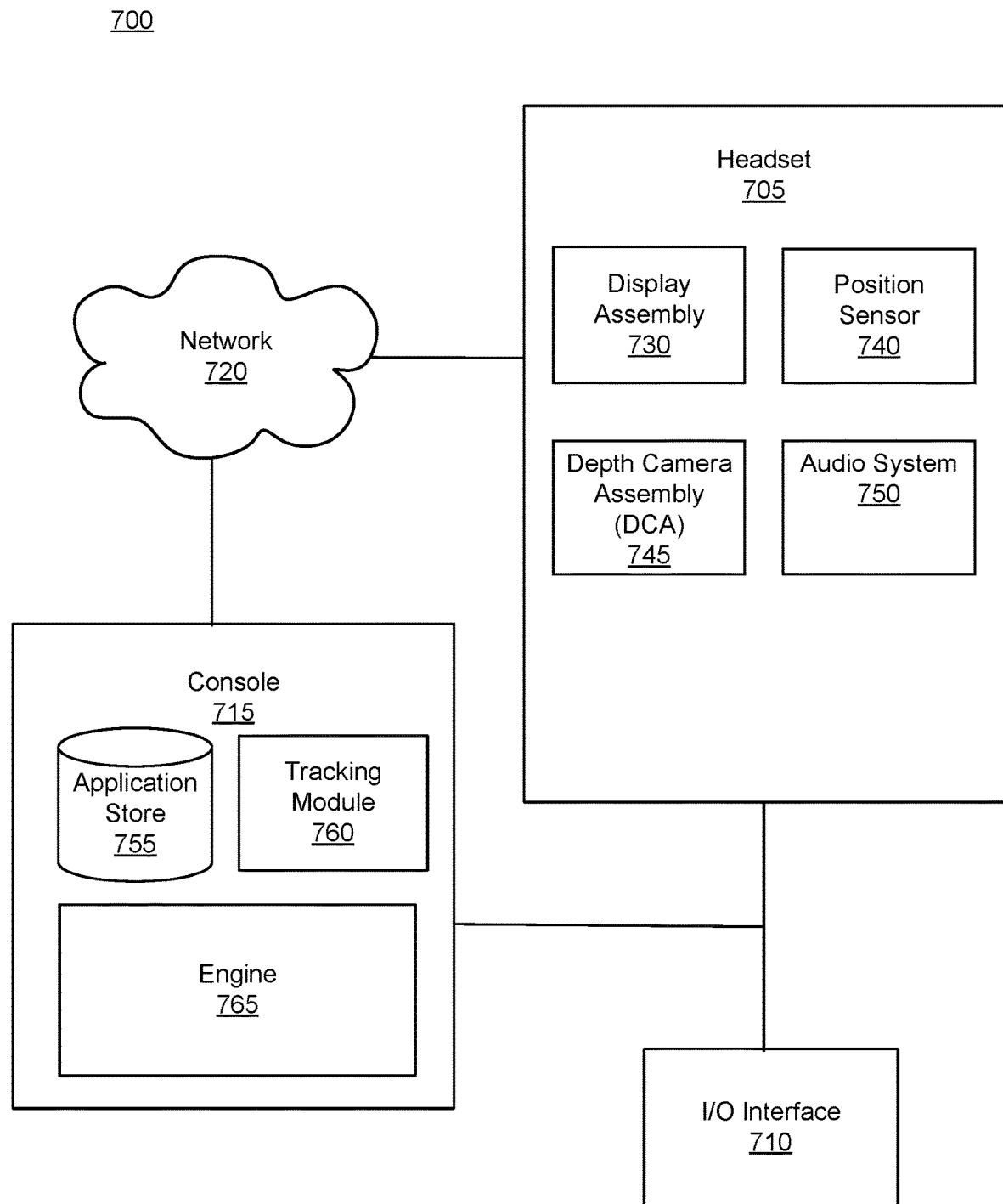
FIG. 7 is a system that includes a headset, in accordance with one or more embodiments.

FIG. 7 is a system 700 that includes a headset 705, in accordance with one or more embodiments. In some embodiments, the headset 705 may be the headset 100 of FIG. 1A or FIG. 1B. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715 and the network 720. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, one or more position sensors 740, and the DCA 745. The display assembly 730 may include all or a subset of the components of the display assembly 200. The display assembly 730 can include a waveguide assembly, one or more piezoelectric movement sensors coupled to the waveguide assembly, and a display controller. The waveguide assembly of the display assembly 730 is configured to project image light towards an eyebox. Movement of the waveguide assembly may contribute at least in part to an amount of aberration in the projected image light. The display assembly 730 includes one or more piezoelectric movement sensors configured to monitor the movement of the waveguide assembly. The display controller is configured to correct for the amount of aberration in the image light based in part on the monitored movement. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof.

The display assembly 730 may magnify image light received from the electronic display, corrects optical errors associated with the image light, and presents the corrected image light to one or both eyeboxes of the headset 705. In various embodiments, the display assembly 730 includes one or more optical elements. Example optical elements included in the display assembly 730 include: an aperture, a Fresnel lens, a convex lens, a concave lens, a filter, a reflecting surface, or any other suitable optical element that affects image light. Moreover, the display assembly 730 may include combinations of different optical elements. In some embodiments, one or more of the optical elements in the display assembly 730 may have one or more coatings, such as partially reflective or anti-reflective coatings.

Magnification and focusing of the image light by the display assembly 730 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the display assembly 730 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the display assembly 730 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUS, one or more accelerometers, one or more gyroscopes, one or more magnetometers, another suitable type of sensor that detects motion, or some combination thereof. The position sensor 740 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 1A.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 700 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A display assembly comprising:
   a waveguide assembly configured to project image light towards an eyebox, wherein an amount of aberration in the image light is based in part on a movement of the waveguide assembly;
   one or more piezoelectric movement sensors coupled to the waveguide assembly, the one or more piezoelectric movement sensors configured to monitor the movement of the waveguide assembly; and
   a display controller configured to correct for the amount of aberration in the image light based in part on the monitored movement.

2. The display assembly of claim 1, wherein the one or more piezoelectric movement sensors comprises:
   a plurality of electrodes; and
   a piezoelectric thin film.

3. The display assembly of claim 2, wherein the piezoelectric thin film is a continuous layer of a piezoelectric material.

4. The display assembly of claim 2, wherein the piezoelectric thin film is a plurality of discrete layers of a piezoelectric material.

5. The display assembly of claim 1, wherein each electrode of a plurality of electrodes has a length that ranges from 2-10 millimeters.

6. The display assembly of claim 1, wherein the one or more piezoelectric movement sensors are oriented in a plurality of orientations, wherein a first orientation of the plurality of orientations is orthogonal to a second orientation of the plurality of orientations.

7. The display assembly of claim 1, wherein the one or more piezoelectric movement sensors are oriented in a plurality of orientations, wherein an orientation of the plurality of orientations is radial with respect to a center of the waveguide assembly.

8. The display assembly of claim 1, wherein the waveguide assembly includes a center region that is circumscribed by a peripheral region, and a piezoelectric thin film of the one or more piezoelectric movement sensors is located in the peripheral region and not the center region.

9. The display assembly of claim 1, wherein a piezoelectric thin film of the one or more piezoelectric movement sensors is layered over an outward facing area of the waveguide assembly proximal to an environment, wherein an inward facing area of the waveguide assembly is proximal to a user.

10. The display assembly of claim 1, wherein the display assembly is coupled to a headset.

11. The display assembly of claim 1, wherein the one or more piezoelectric movement sensors is a first set of piezoelectric movement sensors and wherein the waveguide assembly is a first waveguide assembly for a first eye of a user, the display assembly further comprising:
a second set of piezoelectric movement sensors coupled to a bridge connecting the first waveguide assembly to a second waveguide assembly for a second eye of the user, the second set of piezoelectric movement sensors configured to monitor a relative movement between the first waveguide assembly and the second waveguide assembly.

12. The display assembly of claim 11, wherein the display controller is further configured to:
modify at least one of a first image light projected by the first waveguide assembly or a second image light projected by the second waveguide assembly based on the relative movement,
wherein at least one of the modified first image light or the modified second image light corrects for aberration affecting display of a three-dimensional artificial reality object using the first image light and the second image light.

13. The display assembly of claim 1, further comprising:
a projector assembly comprising a plurality of light sources that generate the image light,
wherein the waveguide assembly includes one or more waveguides configured to receive the image light and project the image light for a pupil replication in the eyebox; and
wherein the display controller is further configured to cause the projector assembly to correct the image light to mitigate the amount of aberration.

14. The display assembly of claim 1, wherein the waveguide assembly includes one or more waveguides, and the display assembly further comprises:
actuators configured to modify a shape of a waveguide of the one or more waveguides; and
wherein the display controller is further configured to:
determine movement instructions for modifying the shape of the waveguide based on the monitored movement of the waveguide assembly; and
instruct the actuators to modify the shape of the waveguide in accordance with the movement instructions.

15. The display assembly of claim 1, further comprising:
a temperature sensor configured to determine a temperature of an environment in which the display assembly operates; and
wherein the display controller is further configured to correct for the amount of aberration in the image light based on the temperature.

16. A method comprising:
projecting image light from a waveguide assembly towards an eyebox, wherein an amount of aberration in the image light is based in part on a movement of the waveguide assembly;
monitoring, via one or more piezoelectric movement sensors coupled to the waveguide assembly, the movement of the waveguide assembly; and
correcting for the amount of aberration in the image light based in part on the monitored movement.

17. The method of claim 16, wherein the one or more piezoelectric movement sensors is a first set of piezo electric movement sensors and wherein the waveguide assembly is a first waveguide assembly for a first eye of a user, the method further comprising:
monitoring a relative movement between the first waveguide assembly and a second waveguide assembly for a second eye of the user, wherein a second set of piezoelectric movement sensors are coupled to a bridge connecting the first waveguide assembly to the second waveguide assembly; and
monitoring at least one of a first image light projected by the first waveguide assembly or a second image light projected by the second waveguide assembly based on the relative movement,
wherein at least one of a modified first image light or a modified second image light corrects for aberration affecting display of a three-dimensional artificial reality object using the first image light and the second image light.

18. The method of claim 16, further comprising:
generating the image light using a plurality of light sources of a projector assembly;
receiving, at one or more waveguides of the waveguide assembly, the image light;
projecting, at the one or more waveguides, the image light for a pupil replication in the eyebox; and
causing the projector assembly to correct the image light to mitigate the amount of aberration.

19. The method of claim 16, wherein the waveguide assembly includes one or more waveguides, and the method further comprising:
modifying a shape of a waveguide of the one or more waveguides;
determining movement instructions for modifying the shape of the waveguide based on the monitored movement of the waveguide assembly; and
instructing actuators to modify the shape of the waveguide in accordance with the movement instructions.

20. A non-transitory computer-readable storage medium comprising stored instructions, the instructions when executed by a processor of a device, causing the device to:
project image light from a waveguide assembly towards an eyebox, wherein an amount of aberration in the image light is based in part on a movement of the waveguide assembly;
monitor, via one or more piezoelectric movement sensors coupled to the waveguide assembly, the movement of the waveguide assembly; and
correct for the amount of aberration in the image light based in part on the monitored movement.

* * * * *